(12) United States Patent
Kim

(10) Patent No.: US 9,790,029 B2
(45) Date of Patent: Oct. 17, 2017

(54) CONVEYOR-USING PACKING MANAGEMENT SYSTEM

(71) Applicant: Inbet Co., Ltd., Seoul (KR)

(72) Inventor: Jong Cheol Kim, Seoul (KR)

(73) Assignee: INBET CO., LTD., Seoul (KR)

(*) Notice: Subject to any disclaimer, the term of this patent is extended or adjusted under 35 U.S.C. 154(b) by 0 days.

(21) Appl. No.: 15/412,383

(22) Filed: Jan. 23, 2017

(65) Prior Publication Data

US 2017/0210564 A1  Jul. 27, 2017

(30) Foreign Application Priority Data

Jan. 25, 2016 (KR) .................. 10-2016-0008970
Jan. 9, 2017 (KR) .................. 10-2017-0002943

(51) Int. Cl.
*G06F 7/00* (2006.01)
*B65G 1/137* (2006.01)
*B65G 17/00* (2006.01)

(52) U.S. Cl.
CPC .......... *B65G 1/1376* (2013.01); *B65G 17/00* (2013.01)

(58) Field of Classification Search
None
See application file for complete search history.

(56) References Cited

U.S. PATENT DOCUMENTS 5,737,438 A * 4/1998 Zlotnick .................. B07C 3/14
  209/584
2008/0169343 A1* 7/2008 Skaaksrud ............ G06Q 10/08
  235/376

FOREIGN PATENT DOCUMENTS

KR  10-2011-0019249 A  7/2011
KR  10-2013-0089935 A  8/2013
KR  10-2014-0124904 A  5/2015

OTHER PUBLICATIONS

Korean Office Action dated Sep. 1, 2017 in counterpart Korean Application No. 10-2017-0002943 (5 pages in Korean).

* cited by examiner

*Primary Examiner* — Yolanda Cumbess
(74) *Attorney, Agent, or Firm* — NSIP Law

(57) ABSTRACT

A conveyor-using packing management system is provided. Images of tasks for respective article packing sections in order with respect to a plurality of boxes are simultaneously acquired so that efficiency of the packing management is enhanced, and loss and stress of a packing company in response to an occurrence of a customer claim due to a delivery accident are minimized by providing the customer with an image of a packing task.

10 Claims, 2 Drawing Sheets

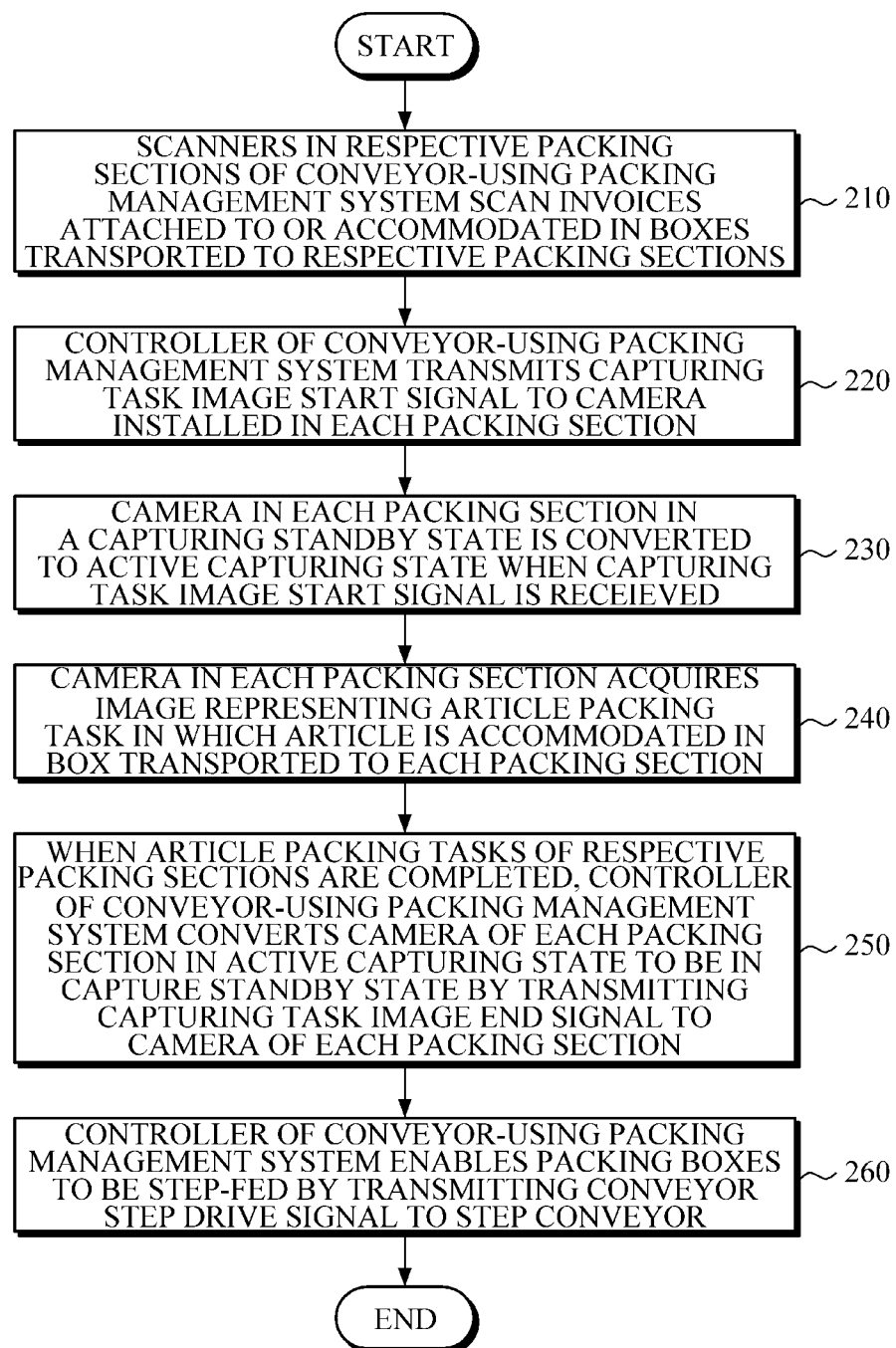

CONVEYOR-USING PACKING MANAGEMENT SYSTEM

CROSS-REFERENCE TO RELATED APPLICATION(S)

This application claims priority from Korean Patent Application Nos. 10-2016-0008970, filed on Jan. 25, 2016 and 10-2017-0002943, filed on Jan. 9, 2017 in the Korean Intellectual Property Office, the disclosure of which is incorporated herein by reference in its entirety.

BACKGROUND

1. Field

The following description relates to a technology for packing management, and more particularly, to a conveyor-using packing management system.

2. Description of Related Art

Korean patent unexamined publication No. 10-2013-0089935 (Aug. 13, 2013) filed by the applicant of the present disclosure suggests a real-time packing management apparatus capable of minimizing loss and stress for a packaging company at a time at which a customer claim due to a delivery accident occurs by efficiently managing an image which was taken during a process of packing an article to be provided to the customer, who receives the delivery article, when the customer claim due to the delivery accident occurs.

Articles which are picked up from a picking zone of a warehouse of a packing company are transported by a cart and are then respectively accommodated in packing racks of article packing sections, and workers take the articles from the picking racks and put the article in boxes to perform a packing task.

The inventor of the present disclosure has conducted studies regarding technology for enhancing the efficiency in packing management and minimizing loss and stress of a packing company at a time at which a customer claim due to a delivery accident occurs by simultaneously acquiring images of tasks of respective article packing sections in order with respect to a plurality of boxes.

RELATED ART DOCUMENT

Patent Document

Korean Patent Unexamined Publication No. 10-2013-0089935 (Aug. 13, 2013)

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a conveyor-using packing management system capable of simultaneously acquiring images of tasks of respective article packing sections in order with respect to a plurality of boxes.

In one general aspect, a conveyor-using packing management system includes a step conveyor, a plurality of cameras, a plurality of scanners, and a controller. The step conveyor is configured to step-feed packing boxes. The plurality of cameras are configured to acquire task images for respective packing sections with respect to the packing boxes that are step-fed by the step conveyor. The plurality of scanners are configured to scan invoices attached to or accommodated by the packing boxes step-fed by the step conveyor in each of the packing sections. The controller is configured to transmit a capturing task image start signal to a camera in one particular packing section in response to an invoice being recognized by a scanner in the particular packing section among the plurality of scanners so that a task image of the particular packing section is acquired.

The conveyor-using packing management system may further include a storage configured to store the task images for the respective packing sections acquired by the cameras of the respective packing sections in a local memory or a server according to respective pieces of invoice identification information of the invoices scanned by the scanners of the respective packing sections.

When invoices having the same identification information are recognized in a plurality of packing sections and a plurality of task images for respective packing sections corresponding to the single invoice identification information are acquired, the storage may merge and store the plurality of task images for the respective packing sections as a single image file.

The controller may transmit a capturing task image end signal to the cameras of the respective packing sections to control driving of the cameras to be terminated.

The capturing task image end signal may be generated in response to a re-recognition of an invoice by the scanner of the same packing section.

The capturing task image end signal may be generated by a manipulation of a button installed in each of the packing sections.

The capturing task image end signal may be generated when all articles that need to be accommodated in a box are accommodated in the box.

The capturing task image end signal may be generated according to a sensed weight of a box.

The capturing task image end signal may be generated according to a particular gesture being sense.

When the capturing task image end signal is generated, the controller may control the packing boxes to be step-fed by transmitting a conveyor step drive signal to the step conveyor.

Other features and aspects will be apparent from the following detailed description, the drawings, and the claims.

BRIEF DESCRIPTION OF THE DRAWINGS

FIG. 2 is a flow chart showing an example of a packing operation in a conveyor-using packing management system according to an exemplary embodiment of the present disclosure.

Figure 1:
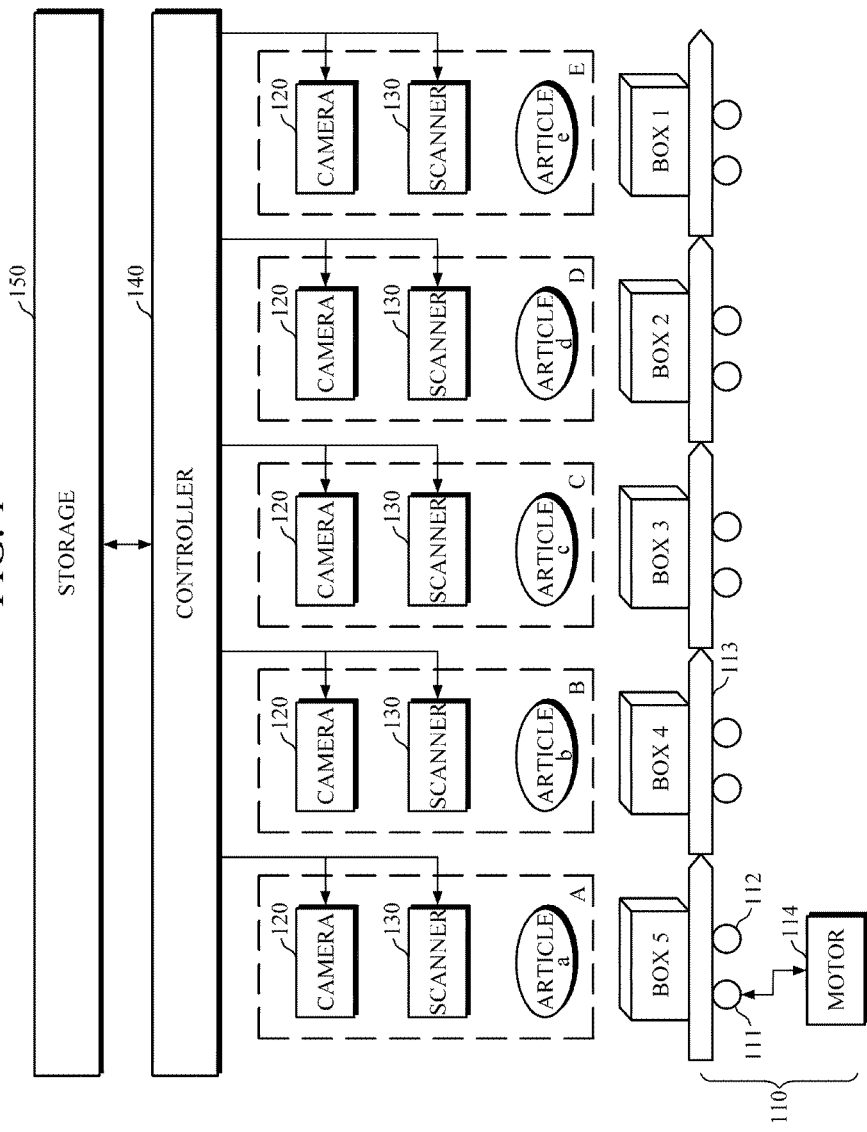
FIG. 1 is a block diagram illustrating a configuration of a conveyor-using packing management system according to an exemplary embodiment of the present disclosure.

Throughout the drawings and the detailed description, unless otherwise described, the same drawing reference numerals should be understood as referring to the same elements, features, and structures. The relative size and depiction of these elements may be exaggerated for clarity, illustration, and convenience.

DETAILED DESCRIPTION

Hereinafter, exemplary embodiments of the present disclosure will be described in detail with reference to the accompanying drawings so that the one skilled in this field might easily understand and advantageously implement the present disclosure.

In the description of the embodiments, a detailed description of related known functions or constructions will be omitted to avoid obscuring the subject matter of the present disclosure.

In addition, terms, which will be described below, are defined in consideration of functions in the embodiments of the present disclosure, and may vary with an intention of a user and an operator or a custom. Accordingly, the definition of the terms should be determined based on the overall content of the specification.

FIG. 1 is a block diagram illustrating a configuration of a conveyor-using packing management system to an exemplary embodiment of the present disclosure. Referring to FIG. 1, a conveyor-using packing management system 100 using a conveyor includes a step conveyor 110, a plurality of cameras 120, a plurality of scanners 130, and a controller 140.

The step conveyor 110 step-feeds packing boxes. The step conveyor 110 simultaneously and automatically transports at least one box at a continuous or discontinuous time interval by a particular distance.

For example, the step conveyor 110 includes at least one rotating roller 111, a plurality of support rollers 112, a rotating belt 113 rotated by the rotating roller 111 and the support rollers 112, and a motor 114 configured to rotate the at least one rotating roller 111 by a predetermined number of rotations.

The plurality of cameras 120 acquire task images for respective packing sections with respect to packing boxes that are step-fed by the step conveyor 110. The packing section is a space in which a packing worker performs a task in which an article is accommodated in a box, and each packing section has a camera 120 installed therein.

The plurality of scanners 130 scan invoices attached to or accommodated by the packing boxes step-fed by the step conveyor 110 in each of the packing sections. For example, the scanner is implemented to scan a bar code in which information about an article order, such as an order article, an order date, and an order number, from the invoice is recorded.

The controller 140 transmits a capturing task image start signal to a camera 120 in one particular packing section in response to recognition of the invoice by a scanner in the particular packing section among the plurality of scanners so that a task image of the particular packing section is acquired.

Referring to FIG. 1, it is assumed that five packing sections (packing sections A to E) are set, five boxes (boxes 1 to 5) are respectively transported to the packing sections A to E by the step conveyor 110, and packing tasks are performed on articles (articles a to e) in the respective packing sections A to E.

When an invoice of the box 5 is scanned by a scanner 130 installed in the packing section A, the controller 140 transmits a capturing task image start signal to a camera 120 installed in the packing section A.

The camera 120 in the packing section A in a capture standby state is converted to be in an active capturing state when the capturing task image start signal is received from the controller 140, and thus images a packing task in which the article a is accommodated in the box 5 transported to the packing section A. In this manner, packing tasks in which articles are accommodated in the packing sections B to E are independently imaged.

That is, a single box that passes through each of the packing sections sequentially accommodates a plurality of articles, and task images for the respective packing sections with respect to the single box are sequentially acquired. Also, images of articles being packed with respect to a plurality of boxes are simultaneously acquired in the plurality of packing sections.

In this case, the articles accommodated in the boxes may be the same or different between each of the packing sections. Also, a plurality of different articles may be accommodated in a single box in each of the packing sections.

Meanwhile, an article identification code is recognized from a bar code that is attached to each article through a scanner installed in each of the packing sections after an invoice is recognized and is compared with an article identification code that is previously set in the corresponding packing section to determine whether an article that needs to be accommodated in a box in the corresponding packing section is correctly accommodated and to give a warning.

As such, since the present disclosure simultaneously acquires images of tasks for respective article packing sections in order with respect to a plurality of boxes, efficiency of the packing management is enhanced, and loss and stress of a packing company in response to an occurrence of a customer claim due to a delivery accident are minimized by providing the customer with the image of the packing tasks.

Meanwhile, according to another exemplary embodiment of the present disclosure, the conveyor-using packing management system 100 may further include a storage 150. The storage 150 may be provided to store task images for the respective packing sections acquired by the cameras of the respective packing sections in a local memory or a server according to respective pieces of invoice identification information of the invoices scanned by the scanners of the respective packing sections. For example, the invoice identification information may be an order number.

In this case, when invoices having the same identification information are recognized in a plurality of packing sections and a plurality of task images for the packing sections corresponding to a single piece of the invoice identification information are acquired, the storage 150 merges and stores the plurality of task images as a single image file.

When a single box is packed to accommodate a plurality of articles in a plurality of packing sections, a plurality of task images for packing sections corresponding to a single piece of invoice identification information are acquired. In this case, the plurality of task images for the packing sections corresponding to the single piece of invoice identification information may be individually provided or may be merged into a single image for convenience of a user and provided.

The task images for the respective packing sections stored in the local memory or the server by the storage 150 are provided to a customer terminal (not shown) at a time at which a customer claim due to a delivery accident occurs.

The task images for the respective packing sections may be transmitted to the customer terminal by a management server (not shown). When a customer receives a delivery article in a box, unpacks the box to check the article, and finds the article to be defective, the customer connects to the management server through the customer terminal and submits a customer claim due to a delivery accident.

When the customer claim due to a delivery accident is generated by the customer terminal, the management server searches task images for respective packing sections stored in the local memory or server, obtains image data about packing an article that has been delivered to the customer, and provides the customer with the image data.

As such, the present disclosure stores task images for respective packing sections with respect to a plurality of boxes in a local memory or a server according to invoice identification information to efficiently manage images representing tasks of packing articles that are delivered for each orderer.

Accordingly, when a customer claim due to a delivery accident occurs, an image of a process of packing the article is provided to a corresponding customer so that who is liable for a fault between a packing company and a delivery company is determined, thereby minimizing loss and stress of the packing company at a time at which a customer claim due to a delivery accident occurs.

Meanwhile, according to another exemplary embodiment of the present disclosure, the controller 140 may control the camera of each packing section to stop operating by transmitting a capturing task image end signal to the camera of each of the packing sections.

For example, the capturing task image end signal may be implemented to be generated when an invoice is re-recognized by the scanner 130 in the same packing section. When the invoice is recognized by the scanner 130 of a packing section, the controller 140 enables a task image of the packing section to be acquired by transmitting the capturing task image start signal to the camera 120 of the packing section, and when the task is completed and the invoice is re-recognized by the scanner 130 in the packing section, the controller 140 enables the task image capturing of the packing section to be terminated by transmitting the capturing task image end signal to the camera 120 of the packing section.

Alternatively, the capturing task image end signal may be implemented to be generated through a manipulation of a button (not shown) installed in each packing section. When an invoice is recognized by the scanner 130 of a packing section, the controller 140 enables a task image of the packing section to be acquired by transmitting the capturing task image start signal to the camera 120 of the packing section, and when the task is completed and a user manipulates the button installed in the packing section, the controller 140 enables the task image capturing of the packing section to be terminated by transmitting the capturing task image end signal to the camera 120 of the packing section.

Alternatively, the capturing task image end signal may be implemented to be generated when all articles that need to be accommodated in a box are accommodated in the box. When an invoice is recognized by the scanner 130 of a packing section, the controller 140 enables a task image of the packing section to be acquired by transmitting the capturing task image start signal to the camera 120 of the packing section and determines whether all of the articles that need to be accommodated in the box are accommodated in the box by recognizing an article identification code attached to each article accommodated in the box through the scanner 130 in the packing section. When all of the articles that need to be accommodated in the box are accommodated in the box, the controller 140 enables the task image capturing of the packing section to be terminated by transmitting the capturing task image end signal to the camera 120 of the packing section.

Alternatively, the capturing task image end signal may be implemented to be generated according to sensing of a weight of a box. When an invoice is recognized by the scanner 130 of a packing section, the controller 140 enables a task image of the packing section to be acquired by transmitting the capturing task image start signal to the camera 120 of the packing section, and when a sum of weights of respective articles accommodated in the box and the weight of the box is sensed to be within a preset weight range (a weight deviation) by a weight detecting sensor (not shown) of the step conveyor 110 the controller 140 enables the task image capturing of the packing section to be terminated by transmitting the capturing task image end signal to the camera 120 of the packing section.

Alternatively, the capturing task image end signal may be implemented to be generated according to sensing of a particular gesture. When an invoice is recognized by the scanner 130 of a packing section, the controller 140 enables a task image of the packing section to be acquired by transmitting the capturing task image start signal to the camera 120 of the packing section, and a worker makes a predetermined gesture, such as drawing a circle with his or her finger when the task is completed. When the predetermined gesture is recognized in the task image acquired by the camera 120 of the packing section, the controller 140 enables the task image capturing of the packing section to be terminated by transmitting the capturing task image end signal to the camera 120 of the packing section.

Meanwhile, according to another exemplary embodiment of the present disclosure, when the capturing task image end signal is generated, the controller 140 controls packing boxes to be step-fed by transmitting a conveyor step drive signal to the step conveyor 110.

As such, when the capturing task image end signal is generated, the controller 140 enables the step conveyor 110 to perform step drive by transmitting the conveyor step drive signal to the step conveyor 110 so that boxes are step-fed.

Hereinafter, a packing process using the above-described conveyor-using packing management system according to the present disclosure is described with reference to FIG. 2. FIG. 2 is a flow chart showing an example of a packing operation by a conveyor-using packing management system according to an exemplary embodiment of the present disclosure.

First, it is assumed that cameras of all packing sections are in a capturing standby state and boxes have been transported to respective packing sections by the step conveyor.

Scanners in the respective packing sections of the conveyor-using packing management system scan invoices attached to or accommodated in the boxes transported to the respective packing sections (210).

The controller of the conveyor-using packing management system transmits a capturing task image start signal to a camera installed in each of the packing sections (220).

Then, the camera in each of the packing sections in the capturing standby state is converted to be in an active capturing state when the capturing task image start signal is received (230).

The camera in each of the packing sections acquires an image representing an article packing task in which an article is accommodated in the box transported to each of the packing sections (240).

When the article packing task of each of the packing sections is completed, a controller of the conveyor-using packing management system converts the camera of each of the packing sections in the active capturing state to be in the capturing standby state by transmitting a capturing task image end signal to the camera of each of the packing sections (250).

Then, the controller of the conveyor-using packing management system enables the packing boxes to be step-fed by transmitting a conveyor step drive signal to the step conveyor (260).

The image acquired by the camera of each of the packing sections of the conveyor-using packing management system and stored is used at a time at which a customer claim due to a delivery accident occurs. Also, the image may be used for logistic agency services, such as a second party logistics (2PL) and third party logistic (3PL), may be used for capturing and recording the entire procedure of sequential tasks, may be used for a delivery company mainly doing business with stores to check for missing articles after articles arrive at stores, may be used to understand a situation of a packing site, may be used to visually and statistically determine manpower management and work efficiency, may be used to visually understand an inventory status for inventory management, or may be used to control and understand a flow of logistics.

As such, since the present disclosure may simultaneously acquire images of tasks for respective article packing sections in order with respect to a plurality of boxes, efficiency of the packing management is enhanced, and loss and stress of a packing company are minimized at a time at which a customer claim due to a delivery accident occurs by providing the customer with an image of the packing task.

As should be apparent from the above, since the present disclosure simultaneously acquires images of tasks for respective article packing sections in order with respect to a plurality of boxes, the efficiency of the packing management can be enhanced, and loss and stress of a packing company can be minimized at a time at which a customer claim due to a delivery accident occurs by providing the customer with an image of the packing task.

A number of examples have been described above. Nevertheless, it should be understood that various modifications may be made. For example, suitable results may be achieved when the described techniques are performed in a different order and/or when components in a described system, architecture, device, or circuit are combined in a different manner and/or replaced or supplemented by other components or their equivalents. Accordingly, other implementations are within the scope of the following claims.

INDUSTRIAL APPLICABILITY

The present disclosure is applicable to packing management technology and applied technology thereof for industrial use.

What is claimed is:

1. A conveyor-using packing management system comprising:
    a step conveyor configured to step-feed packing boxes;
    a plurality of cameras configured to acquire task images for respective packing sections with respect to the packing boxes that are step-fed by the step conveyor;
    a plurality of scanners configured to scan invoices attached to or accommodated by the packing boxes step-fed by the step conveyor in each of the packing sections;
    a controller configured to transmit a capturing task image start signal to a camera in one particular packing section in response to an invoice being recognized by a scanner in the particular packing section among the plurality of scanners so that a task image of the particular packing section is acquired.

2. The conveyor-using packing management system of claim 1, further comprising:
    a storage configured to store the task images for the respective packing sections acquired by the cameras of the respective packing sections in a local memory or a server according to respective pieces of invoice identification information of the invoices scanned by the scanners of the respective packing sections.

3. The conveyor-using packing management system of claim 2, wherein when invoices having the same identification information are recognized in a plurality of packing sections and a plurality of task images for respective packing sections corresponding to the single invoice identification information are acquired, the storage merges and stores the plurality of task images for the respective packing sections as a single image file.

4. The conveyor-using packing management system of one of claims 1, wherein the controller transmits a capturing task image end signal to the cameras of the respective packing sections to control driving of the cameras to be terminated.

5. The conveyor-using packing management system of claim 4, wherein the capturing task image end signal is generated in response to a re-recognition of an invoice by the scanner of the same packing section.

6. The conveyor-using packing management system of claim 4, wherein the capturing task image end signal is generated by a manipulation of a button installed in each of the packing sections.

7. The conveyor-using packing management system of claim 4, wherein the capturing task image end signal is generated when all articles that need to be accommodated in a box are accommodated in the box.

8. The conveyor-using packing management system of claim 4, wherein the capturing task image end signal is generated according to a sensed weight of a box.

9. The conveyor-using packing management system of claim 4, wherein the capturing task image end signal is generated according to a particular gesture being sensed.

10. The conveyor-using packing management system of claim 4, wherein when the capturing task image end signal is generated, the controller transmits a conveyor step drive signal to the step conveyor to control the packing boxes to be step-fed.

* * * * *